Patented Jan. 28, 1941

2,229,897

UNITED STATES PATENT OFFICE 2,229,897

METHOD OF PREPARING ALPHA HYDROXY CARBOXYLIC ACIDS

Vartkes Migrdichian, Greenwich, Conn., assignor to American Cyanamid Company, New York, N. Y., a corporation of Maine No Drawing. Application March 2, 1940, Serial No. 321,897

9 Claims. (Cl. 260—521)

This invention relates to a method of preparing α-hydroxy carboxylic acids from their corresponding cyanhydrins.

It is well known that an α-hydroxy carboxylic acid such as for example α-hydroxy isobutyric acid can be obtained by heating the corresponding cyanhydrin in the presence of a dilute aqueous mineral acid according to the reaction which may be represented by the equation:

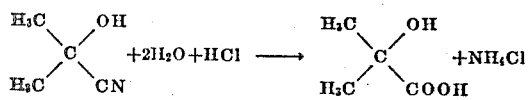

The yield of the desired organic acid is however unsatisfactory since a considerable portion of the cyanhydrin undergoes thermal dissociation to the corresponding aldehyde or ketone and hydrocyanic acid, the latter in turn hydrolyzing to formic acid.

A principal object of the present invention is the provision of a novel, economical and convenient method for preparing α-hydroxy carboxylic acids. Another object is to provide a method for the preparation of α-hydroxy carboxylic acids from their corresponding cyanhydrins wherein thermal dissociation of said cyanhydrins is avoided. A further object is the provision of a method for the production of α-hydroxy carboxylic acids which is characterized by high yields and purity of product. Other objects will become apparent as the description of the invention proceeds.

These objects are accomplished by first hydrolyzing the cyanhydrin to the amide in the presence of a mineral acid in the cold at a temperature not exceeding about 30° C., followed by hydrolysis of the amide by heating the reaction mixture at a temperature greater than 30° C., and preferably between 80° and 110° C.

The hydrolysis in two stages, utilizing the cyanhydrin of acetone may be expressed as follows:

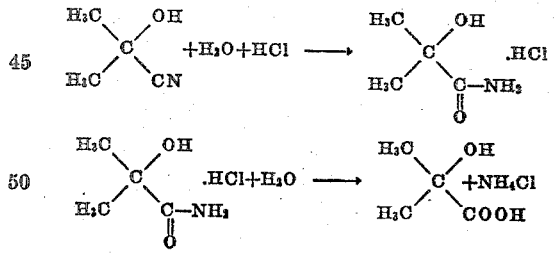

Mineral acids in general are effective as the hydrolyzing agents in this invention, among which may be mentioned hydrochloric, sulfuric, and phosphoric acids, as examples.

In carrying out this invention the cyanhydrin is placed in a suitable vessel cooled by water or a brine solution circulating through an attached jacket. The mineral acid in substantially the molecular amount required for the hydrolysis is then added with thorough agitation at such a rate that the temperature of the reaction mixture does not rise above about 30° C. It is important that the accumulation of any large quantity of unreacted mineral acid be avoided, otherwise a sudden rise in temperature may result with resultant thermal decomposition of cyanhydrin and consequent lowered yields of α-hydroxy carboxylic acid. When the solution no longer shows a tendency to warm up, cooling is discontinued. The cyanhydrin is converted practically quantitatively into the hydroxy acid amide at this point, and may be isolated as such if desired.

The solution is then heated at a temperature greater than 30° C. and preferably between 80° and 110° C. for a period sufficient to complete the hydrolysis. The amide is thereby converted to the hydroxy carboxylic acid which may be used in solution for the preparation of esters.

The hydroxy carboxylic acid may be isolated by cooling the reaction mixture, neutralizing any remaining mineral acid with ammonium hydroxide and removing the precipitated inorganic salt. The hydroxy carboxylic acid is easily recovered by known methods such as extraction with solvents, distillation, sublimation, etc.

The invention will be illustrated in greater detail by the following examples. Parts indicated are by weight.

Example I 100 parts of acetone cyanhydrin are placed in a water-cooled vessel and 132 parts of concentrated hydrochloric acid are added under agitation at such a rate that the temperature of the liquid does not rise above 30° C. After the addition of all the hydrochloric acid, cooling is continued, if necessary, in order to prevent a rise in temperature. After about 4 hours approximately 97% of the cyanhydrin will have become converted into the amide of hydroxy-isobutyric acid. At the end of 12 hours conversion into the amide is practically quantitative.

The solution of amide thus obtained is heated for 4 hours at 90° C. whereby the amide is quantitatively converted into the α-hydroxy isobutyric acid. Sufficient ammonium hydroxide solution is now added to neutralize the free hydrochloric acid. The precipitated ammonium chloride is filtered off and the crude hydroxy isobutyric acid recovered by evaporating the solution under vacuum.

The crude acid may be purified either by crystallization from an organic solvent such as benzene or by distillation under a high vacuum.

*Example II*

100 parts of ethyl methyl ketone cyanhydrin are placed in a water-cooled vessel and 114 parts of concentrated hydrochloric acid are added under agitation at such a rate that the temperature of the liquid does not rise above 30° C. The reaction mixture is treated according to the procedure followed in Example 1.

*Example III*

100 parts of acetaldehyde cyanhydrin are placed in a water-cooled vessel and 158 parts of concentrated hydrochloric acid are added under agitation at such a rate that the temperature of the liquid does not rise above 30° C. The procedure which follows is similar to that of example one. The hydroxy carboxylic acid may be obtained in the form of an 85% solution by concentrating under vacuum.

*Example IV*

100 parts of benzaldehyde cyanhydrin are placed in a water-cooled vessel, and 85 parts of concentrated hydrochloric acid are added under agitation at such a rate that the temperature of the liquid does not rise above 30° C. The treatment which follows is similar to that of procedure given in Example 1.

*Example V*

100 parts of acetophenone cyanhydrin are placed in a water-cooled vessel, and 76 parts of concentrated hydrochloric acid are added under agitation at such a rate that the temperature of the liquid does not rise above 30° C. The treatment which follows is similar to that of procedure given in Example 1.

*Example VI*

100 parts of acetone cyanhydrin are placed in a water-cooled vessel and 115 parts of concentrated sulfuric acid are added under agitation at such a rate that the temperature of the liquid does not rise above 30° C. 85 parts of water are then added.

The solution of amide thus obtained is heated at 90° C. for approximately 4 hours whereby conversion to the $\alpha$-hydroxy isobutyric acid is accomplished. The yield of the desired acid is approximately 96% of the theoretical calculated quantity.

This invention is applicable to the hydrolysis of various cyanhydrins, particularly of the aldehyde and ketone type, of which the following are typical: phenyl ethyl ketone cyanhydrin, methyl propyl ketone cyanhydrin, methyl isobutyl ketone cyanhydrin, diisobutyl ketone cyanhydrin, methyl amyl ketone cyanhydrin, methyl hexyl ketone cyanhydrin, acetonyl acetone cyanhydrin, ethyl butyraldehyde cyanhydrin, n-hexaldehde cyanhydrin, and octaldehyde cyanhydrin.

An economical and convenient method is available for the production of $\alpha$-hydroxy carboxylic acids which is characterized by high yields and extraordinary purity of product.

While the invention has been described with particular reference to specific embodiments, it is to be understood that it is not to be limited thereto but is to be construed broadly and restricted solely by the scope of the appended claims.

I claim:

1. A method of preparing an $\alpha$-hydroxy carboxylic acid which comprises hydrolyzing the corresponding cyanhydrin to the amide of the $\alpha$-hydroxy carboxylic acid in the presence of a mineral acid at a temperature not exceeding about 30° C., hydrolyzing the amide to the $\alpha$-hydroxy carboxylic acid by heating the reaction mixture at a temperature greater than 30° C., separating and recovering the $\alpha$-hydroxy carboxylic acid from the reaction mixture.

2. A method of preparing an $\alpha$-hydroxy carboxylic acid which comprises hydrolyzing the corresponding cyanhydrin to the amide of the $\alpha$-hydroxy carboxylic acid in the presence of a mineral acid at a temperature not exceeding about 30° C., hydrolyzing the amide to the $\alpha$-hydroxy carboxylic acid by heating the reaction mixture at a temperature within the range of 80° to 110° C., separating and recovering the $\alpha$-hydroxy carboxylic acid from the reaction mixture.

3. A method of preparing an aliphatic $\alpha$-hydroxy carboxylic acid which comprises hydrolyzing the corresponding cyanhydrin to the amide of the aliphatic $\alpha$-hydroxy carboxylic acid in the presence of a mineral acid at a temperature not exceeding about 30° C., hydrolyzing the amide to the aliphatic $\alpha$-hydroxy carboxylic acid by heating the reaction mixture at a temperature greater than 30° C., separating and recovering the aliphatic $\alpha$-hydroxy carboxylic acid from the reaction mixture.

4. A method of preparing an aromatic $\alpha$-hydroxy carboxylic acid which comprises hydrolyzing the corresponding cyanhydrin to the amide of the aromatic $\alpha$-hydroxy carboxylic acid in the presence of a mineral acid at a temperature not exceeding about 30° C., hydrolyzing the amide to the aromatic $\alpha$-hydroxy carboxylic acid by heating the reaction mixture at a temperature greater than 30° C., separating and recovering the aromatic $\alpha$-hydroxy carboxylic acid from the reaction mixture.

5. A method of preparing an aliphatic-aromatic $\alpha$-hydroxy carboxylic acid which comprises hydrolyzing the corresponding cyanhydrin to the amide of the aliphatic-aromatic $\alpha$-hydroxy carboxylic acid in the presence of a mineral acid at a temperature not exceeding about 30° C., hydrolyzing the amide to the aliphatic-aromatic $\alpha$-hydroxy carboxylic acid by heating the reaction mixture at a temperature greater than 30° C., separating and recovering the aliphatic-aromatic $\alpha$-hydroxy carboxylic acid from the reaction mixture.

6. A method of preparing an $\alpha$-hydroxy carboxylic acid which comprises hydrolyzing the corresponding cyanhydrin to the amide of the $\alpha$-hydroxy carboxylic acid in the presence of hydrochloric acid at a temperature not exceeding about 30° C., hydrolyzing the amide to the $\alpha$-hydroxy carboxylic acid by heating the reaction mixture at a temperature greater than 30° C., separating and recovering the $\alpha$-hydroxy carboxylic acid from the reaction mixture.

7. A method of preparing an $\alpha$-hydroxy carboxylic acid which comprises hydrolyzing the corresponding cyanhydrin to the amide of the $\alpha$-hydroxy carboxylic acid in the presence of sulfuric acid at a temperature not exceeding about 30° C., hydrolyzing the amide to the $\alpha$-hydroxy carboxylic acid by heating the reaction mixture at a temperature greater than 30° C., separating and recovering the α-hydroxy carboxylic acid from the reaction mixture.

8. A method of preparing α-hydroxy isobutyric acid which comprises hydrolyzing acetone cyanhydrin to the amide of α-hydroxy isobutyric acid in the presence of hydrochloric acid at a temperature not exceeding about 30° C., hydrolyzing the amide to the α-hydroxy isobutyric acid by heating the reaction mixture at a temperature within the range of 80° to 110° C., separating and recovering α-hydroxy isobutyric acid from the reaction mixture.

9. A method of preparing α-hydroxy isobutyric acid which comprises hydrolyzing acetone cyanhydrin to the amide of α-hydroxy isobutyric acid in the presence of sulfuric acid at a temperature not exceeding about 30° C., hydrolyzing the amide to the α-hydroxy isobutyric acid by heating the reaction mixture at a temperature within the range of 80° to 110° C., separating and recovering α-hydroxy isobutyric acid from the reaction mixture.

VARTKES MIGRDICHIAN